United States Patent [19]

Takahashi et al.

[11] Patent Number: 4,483,216
[45] Date of Patent: Nov. 20, 1984

[54] PLANETARY-ROLLER TRANSMISSION WITH ELASTIC ROLLER OR RING

[75] Inventors: Hisayoshi Takahashi, Ama; Shoichi Oda, Nagoya, both of Japan

[73] Assignee: Mitsubishi Jukogyo K.K., Tokyo, Japan

[21] Appl. No.: 10,255

[22] Filed: Feb. 7, 1979

[30] Foreign Application Priority Data

Feb. 20, 1978 [JP] Japan .................... 53-18359
Feb. 20, 1978 [JP] Japan ................ 53-20615[U]

[51] Int. Cl.³ .............................................. F16H 13/06
[52] U.S. Cl. ........................................ 74/798; 74/208
[58] Field of Search ............... 74/798, 208, 206, 214, 74/785, 786, 788, 772, 796

[56] References Cited

U.S. PATENT DOCUMENTS

| | | | |
|---|---|---|---|
| 2,010,793 | 8/1935 | Winkler | 74/798 |
| 2,484,605 | 10/1949 | Boucher | 74/798 |
| 2,815,685 | 12/1957 | Parrett | 74/798 |
| 3,004,453 | 10/1961 | Lang | 74/798 |
| 3,060,767 | 10/1962 | Parrett | 74/214 X |
| 3,160,031 | 12/1964 | Bugg | 74/798 |
| 3,245,286 | 4/1966 | Hewko | 74/798 |
| 3,610,060 | 10/1971 | Hewko | 74/208 |
| 3,717,045 | 2/1973 | Burenga | 74/206 X |

FOREIGN PATENT DOCUMENTS

| | | |
|---|---|---|
| 18215 | of 1904 | Australia . |
| 90532 | 12/1921 | Austria . |
| 475200 | 4/1929 | Fed. Rep. of Germany . |
| 1650741 | 12/1970 | Fed. Rep. of Germany . |
| 2136243 | 4/1977 | Fed. Rep. of Germany . |
| 100766 | 8/1923 | Switzerland . |

Primary Examiner—Leslie A. Braun
Assistant Examiner—Frank McKenzie
Attorney, Agent, or Firm—Wyatt, Gerber, Shoup, Scobey and Badie

[57] ABSTRACT

In a planetary-roller transmission for transmitting power from one rotating shaft to another by a plurality of planet rollers pivotally supported, in contact with the outer periphery of a sun roller connected to the first rotating shaft and also with the inner periphery of an internal contact ring secured to a stationary member, by a carrier connected to the second shaft, all or any of the rollers and ring is an elastic one, which consists of a plurality of thick-walled cylindrical parts spaced apart axially of the associated shaft, a cylindrical part thinner than the thick-walled parts, with its inner or outer periphery serving as a surface to contact the mating roller or ring, and disk-shaped parts thinner than the thick-walled parts and connecting the both sides of the thin-walled cylindrical part separately to the thick-walled parts, so that, when the thick-walled cylindrical parts are pressed toward each other at the both outermost sides, the diameter of the thin-walled cylindrical part is changed, and then the elastic roller or ring is compressed axially of the associated shaft to change its total width so as to change the contact pressure to be exerted between all the rollers and ring. Where the internal contact ring is made elastic, a torque cam mechanism for producing a compressive force proportional to the load on the rotating shafts, axially of the shafts, and imparting the same to the internal contact ring is disposed between the ring and the stationary member.

6 Claims, 13 Drawing Figures (a)  (b)

PLANETARY-ROLLER TRANSMISSION WITH ELASTIC ROLLER OR RING

This invention relates to improvements in a planetary-roller transmission which transmits power by making use of friction developed by rollers in rolling contact.

A conventional transmission system of the character, in a typical application as a speed reducer, is shown in FIGS. 1 and 2. The numeral 1 designates a sun roller directly mounted on an input shaft 8 which is driven for rotation. An internal contact ring 3 is fixedly secured to a casing 10, and a plurality of (in this case, three) planet rollers 2 are therein rotatably supported, through bearings 4, by planet pins 5, all of which in turn are fixed to a common carrier 6.

The sun roller 1, planet rollers 2, and internal contact ring 3 coact to transmit power through the agency of a frictional force U that results from radial bearing, with a contact pressure P, of the rollers against the encircling ring.

In this arrangement, as indicated in FIG. 2, the components are so made that the inside diameter $D_i$ of the internal contact ring 3 is slightly smaller than the sum of the outside diameter $D_s$ of the sun roller 1 and twice the outside diameter $D_p$ of the planet rollers 2 (that is, $D_s + 2D_p$) It is by the forced contact between the ring and rollers with elastic deformation that the contact pressure P is produced. The arrangement presents the following difficulties:

(1) The contact pressure P varies markedly with the interference among the internal contact ring 3, planet rollers 2, and sun roller 1, that is, with $\delta = (D_s + 2D_p) - D_i$. Consequently, the frictional force U required for the transmission of power also varies correspondingly with the contact pressure P and, in order that the frictional force U be obtained as desired, the ring and rollers must be precision finished to the proper contact diameters in $D_i$, $D_p$, and $D_s$, with accurate setting of the interference $\delta$. This adds greatly to the manufacturing cost of the system.

(2) Where there are errors in the machining of the ring and rollers, the interference $\delta$ varies accordingly, making the frictional force U unstable too. This leads to low reliability of the transmission as such.

(3) In assembling the system, it is necessary to provide adequate gaps among the components that are essential for the assembly, either by heating the internal contact ring 3 (for expansion) or by cooling the planet rollers 2 or sun roller 1 (for contraction). Much time and labor, therefore, are needed for the assembling work.

(4) When disassembling, the work must be done with the contact pressure P kept applied. This necessitates considerably strong axial pull-out forces, which can seriously damage the contact surfaces of the ring and rollers.

(5) The sun roller 1, planet rollers 2, internal contact ring 3, and carrier 6 are supported, directly or with bearings, by the casing 10. If the casing 10 is machined with any error, uneven pressure contact between the surfaces would result. When this happens, the life of the system will be shortened.

The present invention, perfected with the view to overcoming the difficulties enumerated above, aims at providing a planetary-roller transmission which is easy to assemble and disassemble, can be built at low cost, attains uniform contact pressure that meets all load conditions to be encountered, and has great durability.

Thus, it is an essential feature of the invention to use a sun roller, planet rollers, and internal contact ring, all or any of which is an elastic roller or ring consisting of thick-walled cylindrical parts spaced apart axially of the associated rotating shaft, a cylindrical part thinner than the thick-walled parts and having a surface to contact the mating roller or ring, and disk-shaped parts thinner than the thick-walled parts and connecting the both sides of the thin-walled cylindrical part separately to the thick-walled parts, so that, when the thick-walled cylindrical parts are pressed toward each other at the both outermost sides, the diameter of the thin-walled cylindrical part is changed.

Another feature of the invention is that, in case when the internal contact ring is an elastic one of the foregoing construction, a torque cam mechanism for producing an axial compressive force proportional to the load on the rotating shafts is disposed between the internal contact ring and the stationary member.

A further feature of the invention is that, where all or any of the sun roller, planet rollers, and internal contact ring consists of the elastic roller or ring, planet pins carrying the planet rollers are supported at both ends in bearings in the form of slots formed in the carrier and are made movable along the slots only radially of the sun roller.

The above and other objects, features, and advantages of the invention will become more apparent from the following description taken in conjunction with the accompanying drawings, in which.

Figure 1:
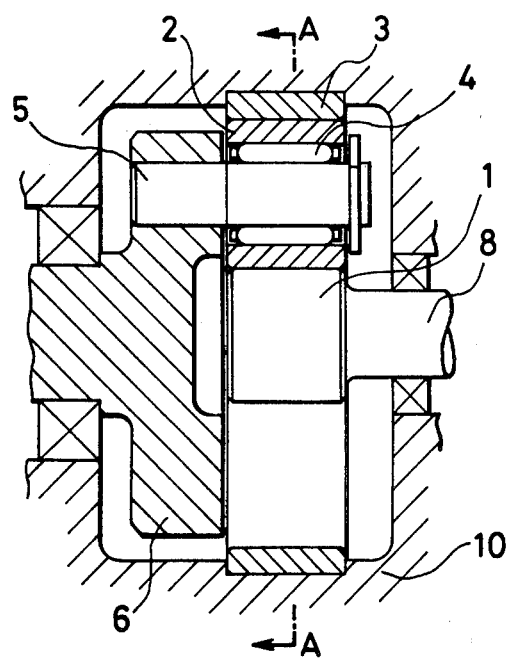
FIG. 1 is a sectional view of a conventional planetary-roller speed reducer, taken along the axes of rotating shafts.
Figure 2:
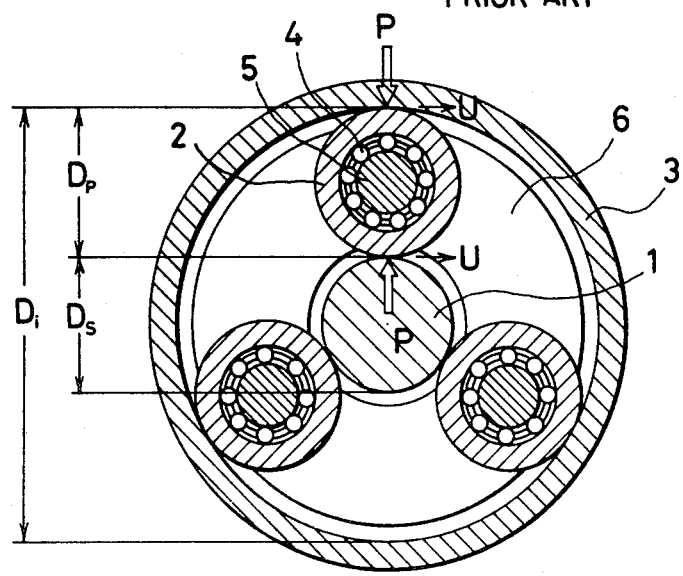
FIG. 2 is a sectional view taken on the line A—A of FIG. 1.
Figure 3:
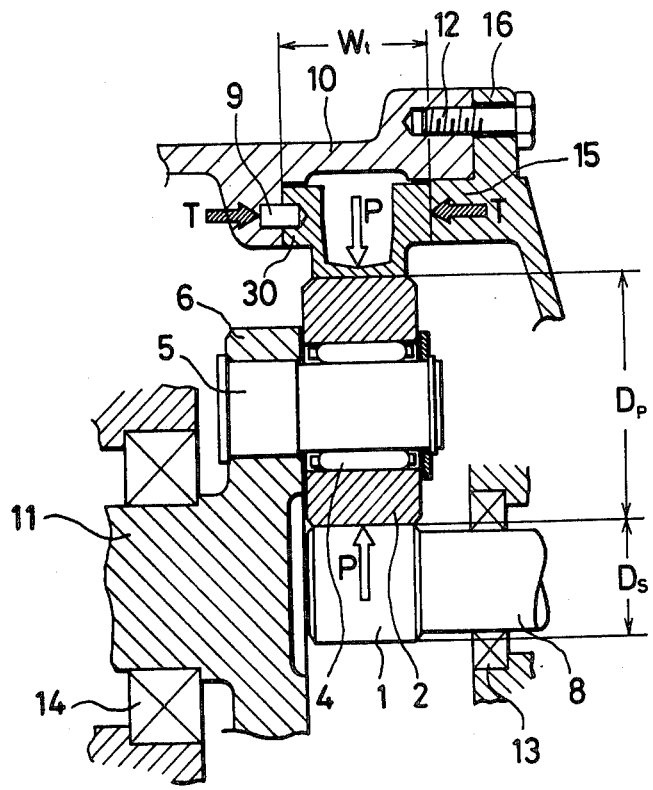
FIG. 3 is a sectional view of an embodiment of the invention, taken along the axes of rotating shafts.
Figure 5:
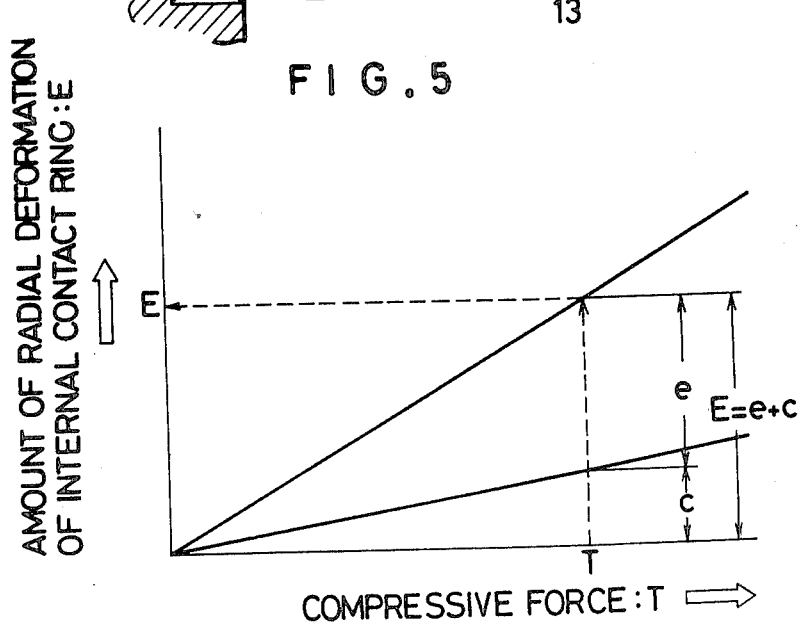
Figure 6:
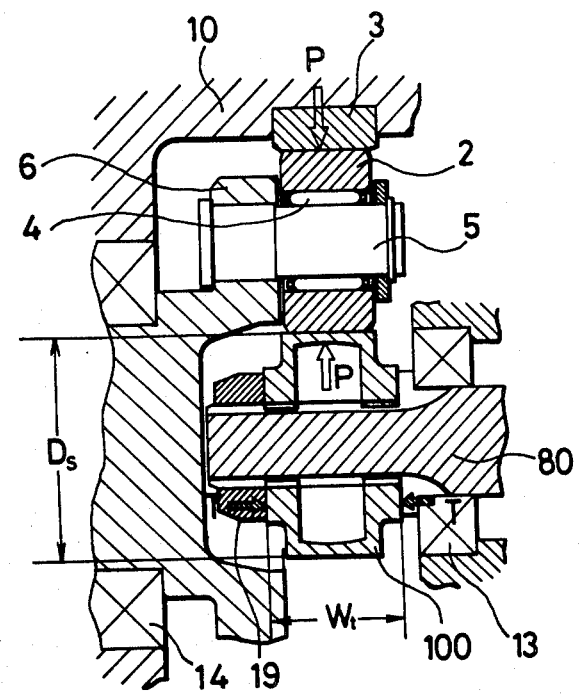
Figure 7:
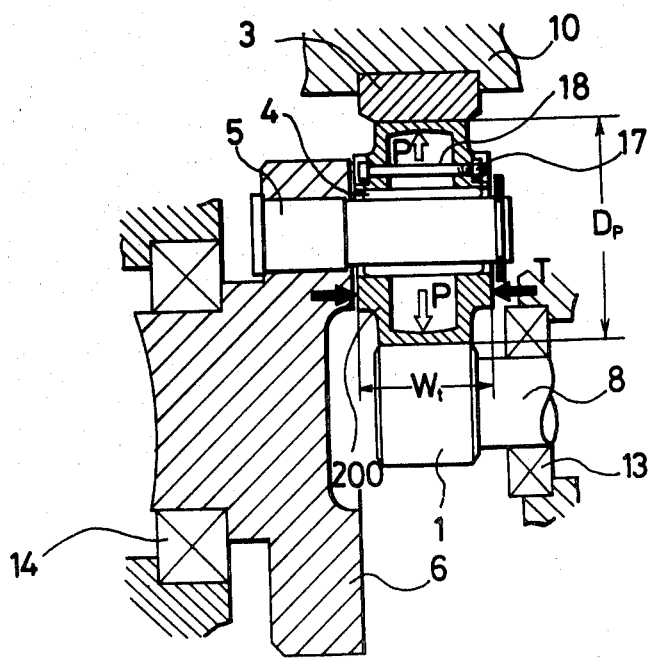
Figure 8:
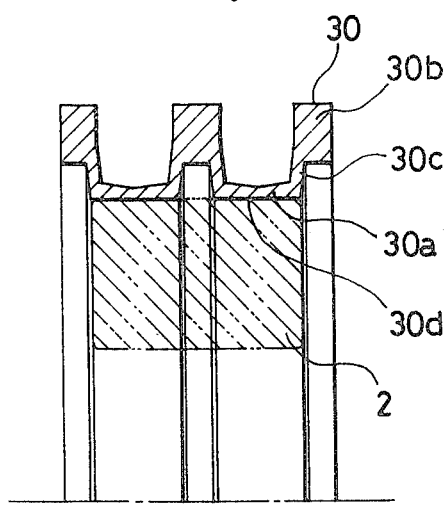
Figure 9:
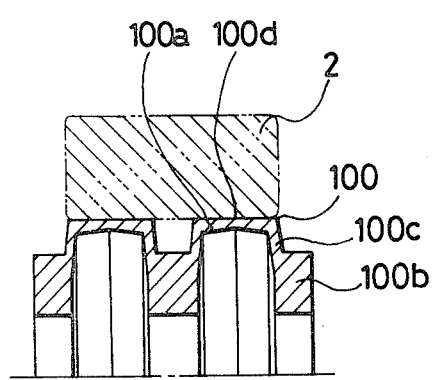
Figure 10:
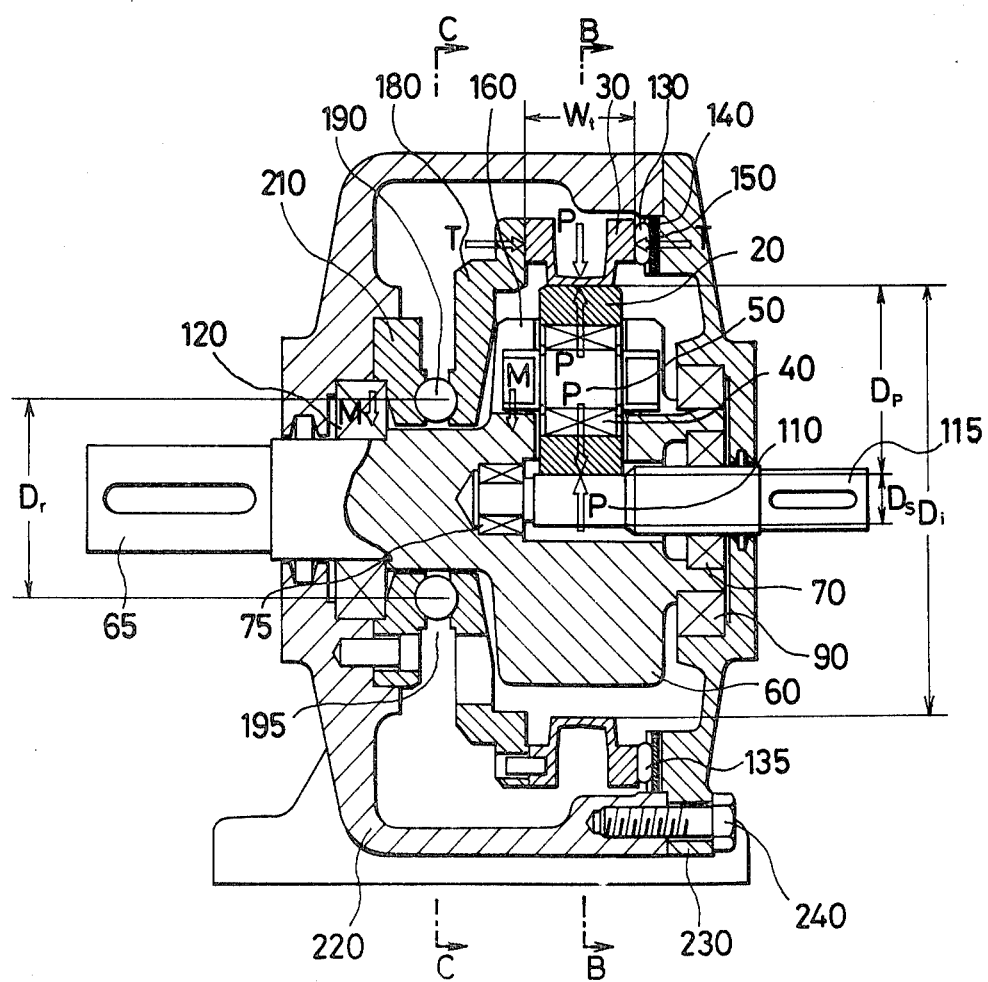
Figure 11:
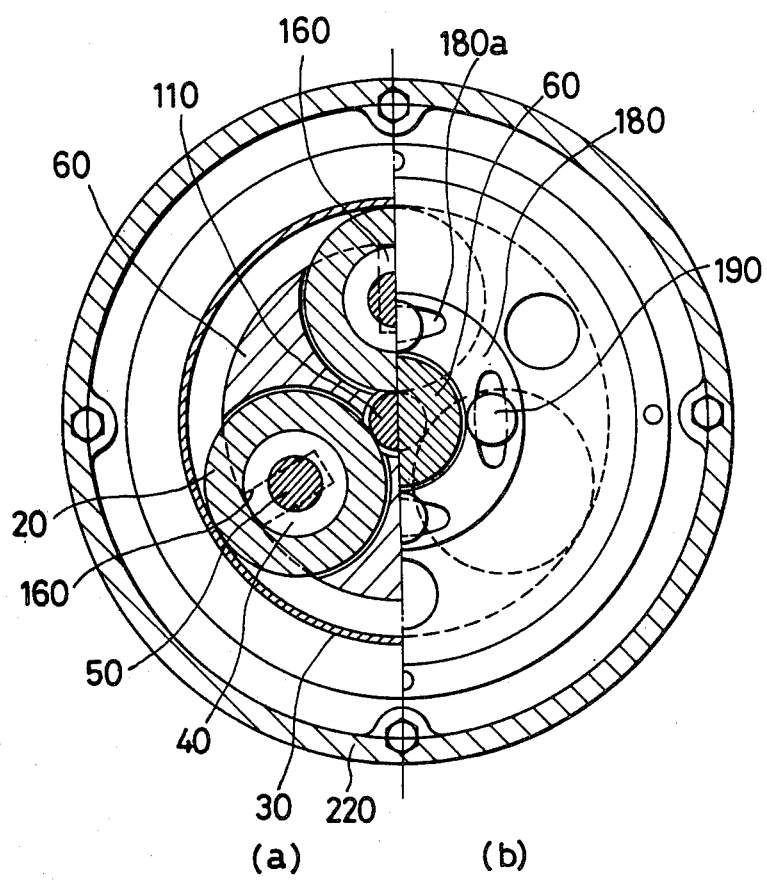
Figure 12:
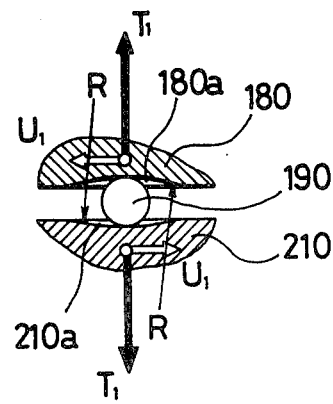

FIGS. 4(a) and (b) are sectional views, respectively, of an elastic roller or ring, before and after its deformation;

FIG. 5 is a chart indicating changes of compressive force;

FIGs. 6 and 7 are sectional views of other embodiments of the invention, both corresponding to FIG. 3;

FIGS. 8 and 9 are sectional views of modified forms of the elastic roller or ring;

FIG. 10 is a sectional view of yet another embodiment of the invention, taken along the axes of rotating shafts;

FIGS. 11(a) and (b) are halves of sectional view taken on the lines B—B and C—C FIG. 10, respectively;

FIG. 12 is a sectional view taken on the line M—M of FIG. 10; and

Figure 13:
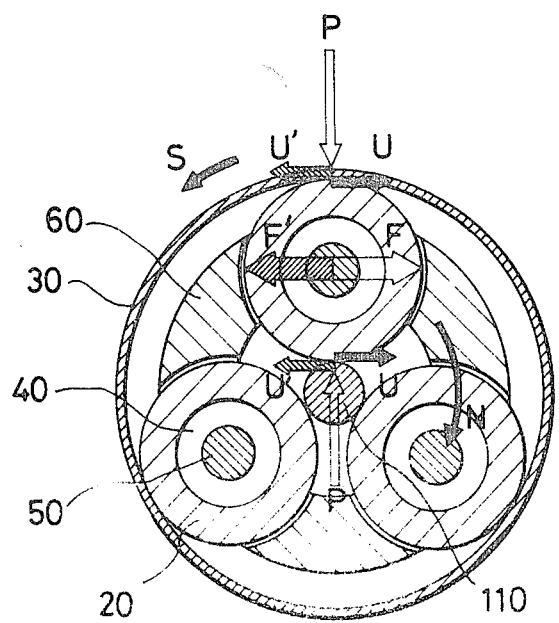

FIG. 13 is a view explanatory of the operation.

Figure 4:
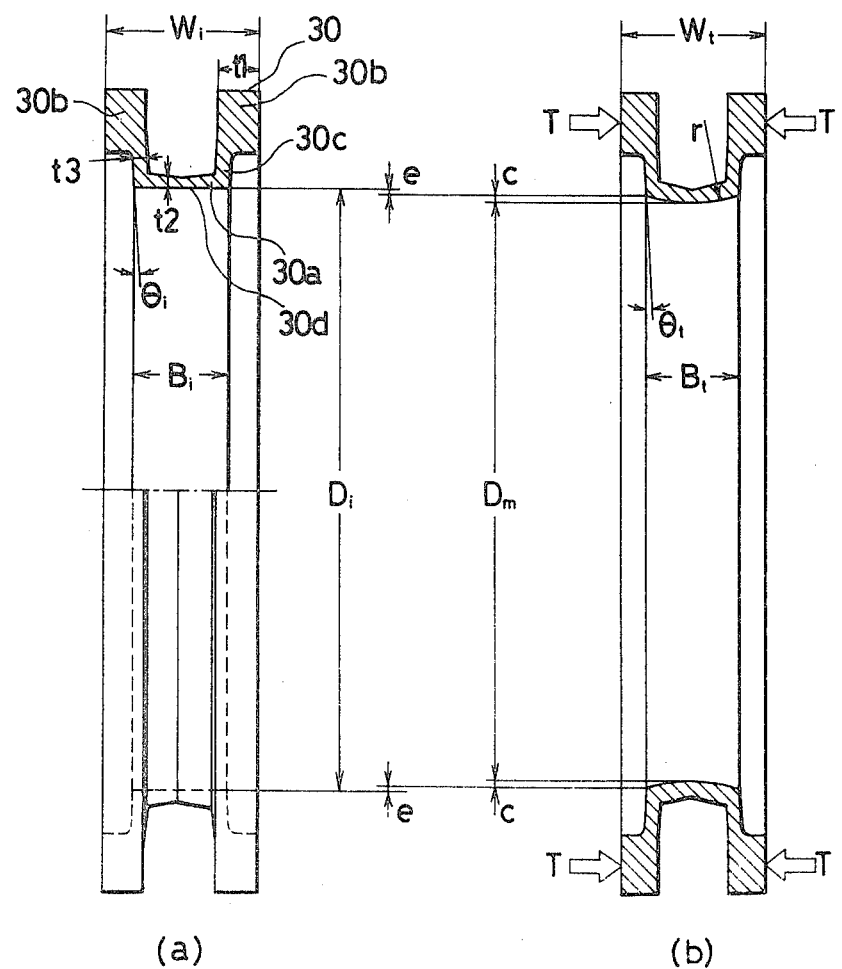

Referring now to FIGS. 3 through 5, an embodiment of the present invention will be described. In FIG. 3, the numeral 1 indicates a sun roller, 2 indicates one of a plurality of planet rollers, and 4 indicates a needle bearing. Also shown are a planet pin 5, carrier 6, input shaft 8, casing 10, output shaft 11, one of bolts 12 for fastening a casing cover 16 to the casing 10, and bearings 13 and 14 that support the input shaft 8 and the output shaft 11, respectively. These components are similar in construction to the conventional ones. Indicated at 30 is an internal contact ring, or elastic ring, made of an elastic material having toughness, such as special steel. The internal contact ring 30 is secured to the casing 10 by pins 9, and a shim 15 is fitted between the ring 30 and the casing cover 16. As better shown in FIGS. 4(a) and (b), the internal contact ring 30 consists of a thin-walled cylindrical part 30a having a surface 30d to contact the planet rollers 2, two thick-walled, cylindrical parts 30b formed in tandem adjacent to respective sides of the thin-walled part 30a and spaced axially of the rotating shafts, such as the input shaft 8 and the output shaft 11, and thin-walled disk-shaped parts 30c which connect the opposite sides of the thin-walled cylindrical part 30a with the adjacent thick-walled cylindrical parts 30b in a U pattern. The two cylindrical parts 30b spaced apart are made relatively thick axially of the rotating shafts, so that the wall thickness $t_2$ of the thin-walled cylindrical part 30a is, for example, one-half or less of the wall thickness $t_1$ of the parts 30b. The disk-shaped parts 30c, on the other hand, are formed to have a wall thickness $t_3$ equal to or slightly greater than the thickness $t_2$ of the thin-walled cylindrical part 30a (but far less than that of the cylindrical parts 30b). The thin-walled cylindrical, part 30c, as shown in FIG. 4(a), is slightly tapered radially upwards with an inclination $\theta_i$ on each side. The taper is provided to avoid deformation of the internal contact ring 30 outwardly of the both sides upon inward compression from both sides with a compressive force T as in FIG. 4(b).

Also, the internal contact ring 30 is so formed that its inside diameter $D_i$ in the free state is a little larger than the sum of the outside diameter $D_s$ of the sun roller 1 and twice the outside diameter $D_p$ of the planet rollers 2, that is, greater than $(D_s + 2D_p)$. This diametral difference enables the planet rollers 2 to be easily introduced into and removed from the system.

With the construction described above, the transmission is assembled by incorporating the sun roller 1 and planet rollers 2 engagedly into the casing 10 and then inserting the internal contact ring 30 in a free state into the casing and securing it to the latter by the pins 9. Because of the slight gap provided between the inner wall surface of the internal contact ring 30 and the outer surfaces of the planet rollers 2, the ring can be fitted in place with extreme ease. After the insertion of the internal contact ring 30, a shim 15 of a suitable thickness is interposed between one end of the outer thick-walled cylindrical part 30b and the casing cover 16, and the bolts 12 are tightened to fasten the casing cover to the casing 10. Upon this fastening the internal contact ring 30, subjected to an axial compressive force T as in FIG. 3, undergoes a contractive deformation from the total width $W_i$ in the free state to a reduced width $W_t$. The reduction of the total width $W_i$ tends to decrease the inside diameter $D_i$ of the internal contact ring accordingly, but the ring is restrained and kept from radial deformation after its contact surface 30d has come into contact with the outer peripheries of the planet rollers 2. Then, a contact pressure P corresponding to that constraint results, pressing the internal contact ring 30 against the planet rollers 2 and the sun roller 1. As the ring is compressed from the free state with the force T in the manner illustrated in FIGS. 4(a) and (b), the total width decreases from $W_i$ to $W_t$, the width of the contact surface 30d from $B_i$ to $B_t$, and the angle of inclination from $\theta_i$ to $\theta_t$, with consequent reduction of the inside diameter from $D_i$ to $D_m$ and crowning c of the contact surface 30d with a radius of curvature r as in FIG. 4(b). Thus, if the ring 30 with an inside diameter in the free state of $D_i = D_s + 2D_p$, for example, is compressed inside the casing, with the compressive force T, the inside diameter will be reduced first by the amount of crowning c (in FIG. 4(b)) and then by an amount of effective deformation e. In this way, with a total amount of compression (c+e), the internal contact ring 30 develops a contact pressure P substantially corresponding to the distance (c+e). In FIG. 5 is plotted the relation between the compressive force T and the amount of radial deformation E of the ring 30. As can be seen from the graph, the deformation E is directly proportional to the compressive force T, and therefore the contact pressure P is also proportional to the force T and the thickness of the shim 15. This means that the contact pressure P can be easily adjusted by changing the thickness of the shim 15 and thereby changing the total thickness $W_t$ of the ring 30, that is, by changing the amounts of crowning c and effective deformation e.

FIG. 6 illustrates another embodiment of the invention, in which a sun roller 100 is made of the same elastic material as the contact ring in FIGS. 4(a) and (b), and the compressive force T is adjusted by changing the total width $W_t$ of the sun roller 100 through tightening of nuts 19. The numeral 3 is an internal contact ring attached to a casing 10, and 80 is an input shaft on which the sun roller 100 is mounted. The rest of construction is the same as in the first embodiment. In this arrangement the outside diameter $D_s$ of the sun roller 100 tends to increase as the nuts 19 are tightened to reduce the total width $W_t$, but the roller is restrained and kept from increasing the diameter by the planet roller 2, thus producing a contact pressure P corresponding to the restraint. The resulting pressure P is directly proportional to the amount of tightening of the nuts 19.

Still another embodiment of the invention, shown in FIG. 7, uses planet rollers 200 of the same material as the elastic ring in FIGS. 4(a) and (b). Each of the planet rollers 200 is supported by a planet pin 5 with a bearing 4, and the thick-walled cylindrical parts of the roller are connected together by clamping bolts 18 arranged at equal intervals in a circle. The compressive force T is adjusted by changing the amount of tightening of nuts 17 on the bolts 18.

As the nuts 17 are tightened to reduce the total width $W_t$ of each planet roller 200, the expansion of the diameter $D_p$ is restrained and a contact pressure P corresponding to the restraint results. The numeral 1 indicates a sun roller mounted on an input shaft 8, and 3 indicates an internal contact ring fitted to a casing 10. The remainder of construction is the same as that of the first embodiment.

In FIG. 8 is shown a modified form of the internal contact ring 30, which consists of a plurality of (in this embodiment, two) ring units of an elastic material. The configurations of individual thin-walled cylindrical parts 30a, thick-walled cylindrical parts 30b, and thin-walled disk-shaped parts 30c of the ring and the manner in which those parts are joined together are similar to those of the embodiment illustrated in FIGS. 4(a) and (b). In this figure, one of the planet rollers is indicated at 2.

FIG. 9 shows another modification, in which the sun roller 100 combines a plurality of roller units of an elastic material. The shapes and manner of connection of its parts, that is, thin-walled cylindrical parts 100a, thick-walled cylindrical parts 100b, and thin-walled disk-shaped parts 100c, are similar to those indicated in FIG. 6. The surface of each sun roller unit in contact with one of the planet rollers 2 is designated 100d.

Although not shown, the planet rollers may, of course, be of the multi-unit construction like the roller in FIG. 9. Also, while only one of the three essential elements, that is, the sun roller, planet rollers, or internal contact ring, is made of an elastic material in the embodiments of the invention so far described, any two or all of the elements may instead be formed of the elastic material.

Extending the description to FIGS. 10 to 13, a further embodiment of the invention is shown. Throughout these figures, 110 is a sun roller mounted on an input shaft 115 to be driven thereby for rotation, 60 is a carrier coupled to an output shaft 65, and 90, 120 are bearings supporting the output shaft 65. 70 and 75 are bearings supporting the input shaft 115. A plurality of (in this case, three) planet pins 50 are supportedly confined at both ends in radial slots 160 formed in the carrier 60, so that they can move only radially relative to the carrier. The numeral 20 indicates planet rollers, each of which is turnably mounted on each said planet pin 50 through a bearing 40. As indicated in FIG. 11(a), each planet pin 50 is partly cut off at both ends to provide flat, narrowed ends of a width conforming to that of the radial slots 160, and the ends are slidably fitted in those openings. Hence the planet pins 50 and planet rollers 20 thereon are supported by the carrier 60 to be movable in the radial slots 160, only radially of the carrier. The numeral 30 denotes an internal contact ring of an elastic material similar to the one employed in the embodiment of FIG. 3. One side of the internal contact ring 30, or that of one of the thick-walled cylindrical parts 30b, is held by a casing cover 230 through a thrust bearing 135 consisting of needle rollers 130 and a race 140 and an adjusting shim 150. The casing cover 230 is fastened to a casing 220 by bolts 240. Also, the opposite side of the internal contact ring 30, or that of the thick-walled cylindrical part 30b (FIG. 4(a)), is secured to one end of a loading cam 180 of a torque cam mechanism 195 now to be described. The torque cam mechanism 195 consists of loading cams 180, 210, and a plurality of steel balls 190. Each of the loading cams is formed, as shown in FIG. 12, with a plurality of (in this case, four) grooves 180a, 210a, each having a radius R, at regular intervals in a circle, and the steel balls 190 are held between the pairs of grooves 180a, 210a.

When assembling the planetary-roller transmission of the afore-described construction, the planet rollers 20 and the sun roller 110 are first engaged together while the internal contact ring 30 is kept in the free state. Then, because of the slight gap formed between the inner periphery of the internal contact ring 30 in the free state and the outer peripheries of the planet rollers 20 (that is, in FIG. 10, $D_i > D_s + 2D_p$), the ring and rollers can be assembled with utmost ease. After the internal contact ring 30 and the torque cam mechanism 195 have been fastened together, a shim 150 of a suitable thickness is fitted between the thrust bearing 135 and the casing cover 230, and the bolts 240 are tightened to fit the cover to the casing 220. By this bolting the internal contact ring 30 is subjected to an axial compressive force T, as indicated in FIGS. 10 and 4, and its total width $W_i$ in the free state is reduced to $W_t$. The reduction in the total thickness of the ring tends to decrease the inside diameter $D_i$ accordingly, but the radial deformation of the ring is restrained after its contact surface 30d has engaged the outer peripheries of the planet rollers 20, and a contact pressure P corresponding to the restraint is produced. With this pressure P, the internal contact ring 30, planet rollers 20, and sun roller 110 bear against one another. Since the contact pressure P is directly proportional to the compressive force T and to the thickness of the shim 150, it follows that the pressure can be easily adjusted by changing the thickness of the shim 150 and therefore the total width $W_t$ of the ring 30, that is, by changing the amounts of crowning c and effective deformation e.

The operation of the planetary-roller transmission under load will now be described. When the output shaft 65 rotates, for example, in the direction N in FIG. 13, each planet pin 50 is subjected, on its axis, to a reaction force F′ of the load-driving force F (F′ = F) corresponding to the load being carried, and a tangential force U′ = F′/2 acts on the sun roller 110 and the internal contact ring 30. As a consequence, the internal contact ring 30 develops a moment of rotation S as in FIG. 13. Then, as illustrated in FIG. 12, a circumferential force $U_1$ that results from the moment S acts on the points where each steel ball 190 and loading cams 180, 210 of the torque cam mechanism 195 contact, and the wedge action of the steel ball 190 in the grooves 180a, 210a of the cams 180, 210 develops a thrust $T_1$. This thrust $T_1$ is directly proportional to the circumferential force $U_1$ and to the load being carried. It acts as a compressive force $T_2$ ($T_2 = T_1$) with which the internal contact ring 30 is pressed inwardly on both sides through the loading cam 180. During the operation under load, therefore, the both sides of the internal contact ring 30 are subjected to the combined action of the compressive force T exerted at the time of assembly and the compressive force $T_2$ proportional to the load being carried, that is, $T_3 = T + T_2$. On the other hand, the planet rollers 20 move suitably because they are radially slidable at both ends within the radial slots 160. A contact pressure $P_3$ directly proportional to the compressive force $T_3$ then acts on the surface portions of the internal contact ring 30 and the planet rollers 20 in contact and also on the surface portions of the planet rollers 20 and the sun roller 110 in contact. The intensity of the compressive force $T_2$, which is proportional to the load being carried, is inversely proportional to the diameter Dr (FIG. 10) of the sectional area over which the torque mechanism 195 works, and therefore the embodiment being described uses the mechanism with the smallest possible diameter Dr.

As described hereinabove, the transmission according to the invention employs the sun roller, planet rollers, and internal contact ring, all or any of which is an elastic member consisting of thick-walled cylindrical parts spaced apart axially of the associated rotating shaft, a thin-walled cylindrical part made thinner than the thick-walled cylindrical parts and having a surface to contact the mating roller or ring, and thin-walled disk-shaped parts for separately connecting the both sides of the thin-walled cylindrical part to the thick-walled cylindrical parts, so that, when the thick-walled cylindrical parts are compressed inwardly at the both outermost sides, the diameter of the thin-walled cylindrical part is changed. With this construction the transmission offers the following advantages:

(1) There is no danger of damaging the surfaces of the sun roller, planet rollers, and internal contact ring at the time of assembly or disassembly, because those components can be assembled or disassembled with slight radial gaps provided between them. Consequently, those components are improved in durability and can be assembled and disassembled with extreme ease.

(2) Contact pressure can be imparted between the components by merely compressing the thick-walled cylindrical parts of the elastic roller or ring at both outermost ends axially of the associated shaft, and the intensity of the contact pressure can be adjusted by changing the width of the elastic roller or ring by means of a shim or the like. Thus, the adjustment of the contact pressure is extremely easy, and uniform and accurate contact pressure is attained even between the rollers and ring with errors in fabrication. Because the even and exact contact pressure is obtained without the need of increasing the machining accuracy of the individual rollers and ring, the manufacturing cost of the transmission can be reduced.

(3) The portion of the elastic roller or ring that contacts the mating component or components is thin-walled and is so flexibly deformable that it absorbs any impact which would accompany uneven contact between the components due to any machining error of the casing or the like. In this sense the contacting portion can prevent the uneven contact and thereby add to the durability of the system.

An additional advantage is derived from the arrangement according to the invention in which the internal contact ring is made of the elastic ring and a torque cam mechanism for producing a compressive force directly proportional to the load being carried is disposed between the internal contact ring and the casing. The internal contact ring of elastic material coacts with the torque cam mechanism to supply a contact pressure in direct proportion to the load being carried. This results in extended life of the pressure contact surfaces and improved transmission efficiency, particularly in low-load operation.

Further, because the planet pins carrying the planet rollers are supported at both ends in bearings in the form of slots formed in the carrier and are made movable only radially of the sun roller, the planet rollers move in the directions where they can equalize whatever differences in contact pressure that may arise between the power-transmitting surfaces of the planet rollers and the internal contact ring and between those of the planet rollers and the sun roller. Consequently, the contact pressure being applied to those transmitting surfaces is kept uniform throughout the operation.

What is claimed is:

1. A planetary-roller transmission for transmitting power from one rotating shaft to another by a plurality of planet rollers rotatably supported in contact with the outer periphery of a sun roller connected to a first rotating shaft and also with the inner periphery of an internal contact ring secured to a stationary member, by a carrier connected to the second rotating shaft, characterized in that at least one of said sun roller, plurality of planet rollers, and internal contact ring being formed from an elastic material and having a plurality of thick-walled cylindrical parts spaced apart axially of the associated rotating shaft, a thin-walled cylindrical part made thinner than said thick-walled parts and serving as the surface contacting adjacent rotating parts, and thin-walled disk-shaped parts thinner than said thick-walled parts and connecting the both sides of said thin-walled cylindrical part separately to said thick-walled parts, so that, when said thick-walled cylindrical parts are pressed toward each other at their respective outermost sides, the diameter of the thin-walled cylindrical part is changed as the thick-walled parts are brought towards one another so as to change the contact pressure to be exerted between all of said rollers and ring.

2. A planetary-roller transmission for transmitting power from one rotating shaft to another by a plurality of planet rollers rotatably supported in contact with the outer periphery of a sun roller connected to a first rotating shaft and also with the inner periphery of an internal contact ring secured to a stationary member, by a carrier connected to the second rotating shaft, characterized in that said internal contact ring is formed from an elastic material and has a plurality of thick-walled cylindrical parts spaced apart axially of the associated rotating shaft, a thin-walled cylindrical part made thinner than said thick-walled parts, with the inner periphery thereof serving as a surface contacting said planet roller, and thin-walled disk-shaped parts thinner than said thick-walled parts and connecting the both sides of said thin-walled cylindrical part separately to said thick-walled parts, so that, when said thick-walled cylindrical parts are pressed toward each other at their respective outermost sides, the diameter of the thin-walled cylindrical part is changed; a torque cam mechanism for producing an axial compressive force proportional to the load on said rotating shafts disposed between said internal contact ring and said stationary member; and said internal contact ring being compressed in the direction parallel to the axis of said associated rotating shaft to change the total width thereof so as to change the contact pressure to be exerted between said ring and rollers.

3. A planetary-roller transmission according to claim 1, characterized in that planet pins carrying said planet rollers are supported at both ends in bearings in the form of slots in said carrier and are made movable therealong only radially of said sun roller.

4. A planetary-roller transmission according to claim 2, characterized in that planet pins carrying said planet rollers are supported at both ends in bearings in the form of slots in said carrier and are made movable therealong only radially of said sun roller.

5. A planetary-roller transmission according to claim 1 or 2, having means including a part of a casing cover for compressing said thick-walled parts towards one another.

6. A planetary-roller transmission according to claim 1, having means for compressing said thick-walled parts in the direction parallel to the axis of said associated shaft including at least one of a nut in thread engagement with said shaft or clamping bolts extended axially through said thick-walled parts and mating nuts to be tightened thereon.

* * * * *